United States Patent
Xin et al.

(10) Patent No.: US 11,757,584 B2
(45) Date of Patent: Sep. 12, 2023

(54) TRANSMISSIONS USING DISCRETE SPECTRA

(71) Applicant: ZTE Corporation, Guangdong (CN)

(72) Inventors: Yu Xin, Guangdong (CN); Tong Bao, Guangdong (CN)

(73) Assignee: ZTE Corporation, Guangdong (CN)

( * ) Notice: Subject to any disclaimer, the term of this patent is extended or adjusted under 35 U.S.C. 154(b) by 313 days.

(21) Appl. No.: 17/339,211

(22) Filed: Jun. 4, 2021

(65) Prior Publication Data

US 2021/0328848 A1 Oct. 21, 2021

Related U.S. Application Data

(63) Continuation of application No. PCT/CN2018/119314, filed on Dec. 5, 2018.

(51) Int. Cl.
*H04L 5/00* (2006.01)
*H04L 27/26* (2006.01)

(52) U.S. Cl.
CPC ........ *H04L 5/0042* (2013.01); *H04L 27/2602* (2013.01); *H04L 27/2605* (2013.01);
(Continued)

(58) Field of Classification Search
CPC ............. H04L 5/0042; H04L 27/26025; H04L 27/2602; H04L 27/2605; H04L 27/2628; H04L 27/2637; H04L 5/0044
See application file for complete search history.

(56) References Cited

U.S. PATENT DOCUMENTS 7,672,384 B2   3/2010   Giannakis et al.
10,491,445 B2  11/2019  Xin et al.
(Continued)

FOREIGN PATENT DOCUMENTS

CN    1611026 A    4/2005
CN    101199149    6/2008
(Continued)

OTHER PUBLICATIONS

Extended European Search Report for EP Patent Application No. 18929985.2, dated Nov. 17, 2021, 8 pages.
(Continued)

*Primary Examiner* — Duc C Ho
(74) *Attorney, Agent, or Firm* — Perkins Coie LLP

(57) ABSTRACT

Methods, apparatus, and systems for efficiently utilizing scattered narrow spectra without introducing interreference among adjacent frequency bands are described. In one example aspect, a wireless communication method includes determining a set of time-domain symbols by applying an inverse Fourier transform to data modulated on multiple subcarrier groups. Each subcarrier group comprises one or more subcarriers and adjacent subcarrier groups are separated by one or more unused subcarriers, and each symbol has a symbol length of T0. The method includes determining a set of modulated time-domain symbols each having a length of N×T1 by modulating the set of time-domain symbols using a waveform function, where N is a real number greater than 1. The method includes transmitting the set of modulated time-domain symbols.

20 Claims, 8 Drawing Sheets

(52) U.S. Cl.
CPC .... *H04L 27/26025* (2021.01); *H04L 27/2628* (2013.01); *H04L 27/2637* (2013.01); *H04L 5/0044* (2013.01)

(56) References Cited

U.S. PATENT DOCUMENTS

| | | | |
|---|---|---|---|
| 2004/0066740 | A1 | 4/2004 | Suh et al. |
| 2004/0114504 | A1 | 6/2004 | Jung et al. |
| 2005/0232138 | A1 | 10/2005 | Byun et al. |
| 2016/0212004 | A1 | 7/2016 | Yun et al. |
| 2019/0036750 | A1* | 1/2019 | Xin .................. H04L 27/26 |

FOREIGN PATENT DOCUMENTS

| | | |
|---|---|---|
| CN | 101199175 | 6/2008 |
| CN | 102638437 A | 8/2012 |
| CN | 106789824 | 5/2017 |
| CN | 106789824 A | 5/2017 |
| CN | 106961406 | 7/2017 |
| CN | 107645464 | 1/2018 |
| CN | 108111447 A | 6/2018 |
| EP | 1791283 A1 | 5/2007 |
| JP | 2006-080798 A | 3/2006 |
| JP | 2018-121107 A | 8/2018 |
| WO | 2006135186 A2 | 12/2006 |
| WO | 2017121412 A1 | 7/2017 |
| WO | 2018/049544 A1 | 3/2018 |

OTHER PUBLICATIONS

International Search Report and Written Opinion dated Aug. 27, 2019 for International Application No. PCT/CN2018/119314, filed on Dec. 5, 2018 (7 pages).
Co-Pending CN Application No. 201880099936.0, First Office Action dated Aug. 1, 2022, 17 pages with unofficial translation.
Co-Pending KR Application No. 10-2021-7020506, Office Action dated Mar. 27, 2023, 7 pages with unofficial translated summary.

* cited by examiner

TRANSMISSIONS USING DISCRETE SPECTRA

CROSS-REFERENCE TO RELATED APPLICATIONS

This application is a continuation of and claims priority to International Patent Application No. PCT/CN2018/119314, filed on Dec. 5, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for efficiently utilizing scattered narrow spectra without introducing interreference among adjacent frequency bands, thereby increasing resource utilization for wireless communication systems.

In one example aspect, a wireless communication method is disclosed. The method includes determining a set of time-domain symbols by applying an inverse Fourier transform to data modulated on multiple subcarrier groups. Each subcarrier group comprises one or more subcarriers and adjacent subcarrier groups are separated by one or more unused subcarriers, and each symbol has a symbol length of T0. The method includes determining a set of modulated time-domain symbols each having a length of N×T1 by modulating the set of time-domain symbols using a waveform function, where N is a real number greater than 1. The method includes transmitting the set of modulated time-domain symbols.

In another example aspect, a wireless communication method is disclosed. The method includes receiving a set of modulated time-domain symbols each having a length of N×T1. The set of modulated time-domain symbols corresponds to an output of applying a waveform function to a set of time-domain symbols each having a symbol length of T0, and N is a real number greater than 1. The method includes demodulating the set of modulated time-domain symbols to obtain the set of time-domain symbols. The method also includes applying a Fourier transform to the set of time-domain symbols to obtain data modulated on multiple subcarrier groups. Each subcarrier group comprises one or more subcarriers and adjacent subcarrier groups are separated by one or more unused subcarriers.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

Figure 1:
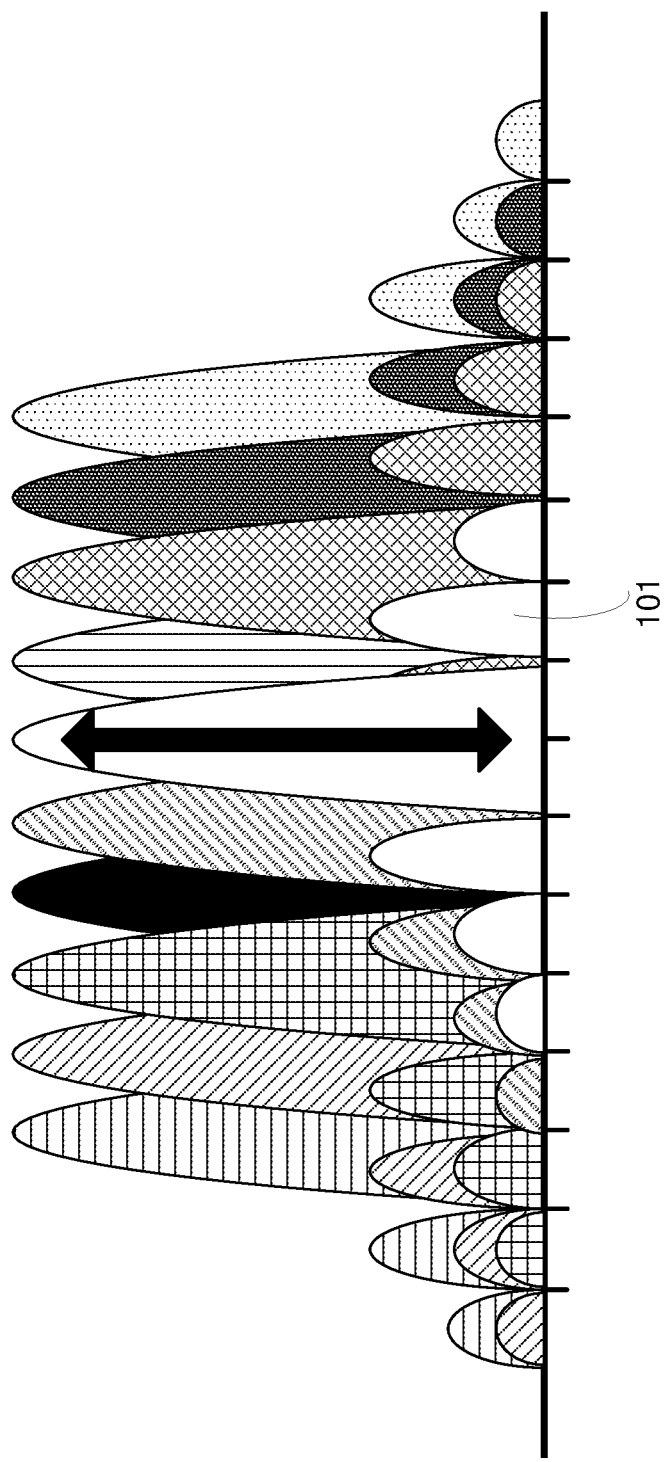
FIG. 1 shows a schematic diagram of side lobes producing overlapping spectra between subcarriers in the frequency domain.

In telecommunication, Long-Term Evolution (LTE) is the fourth generation (4G) standard for high-speed wireless communication. The LTE system adopts Orthogonal Frequency Division Multiplexing (OFDM) technology, which has been widely used in wireless communication. For example, the Cyclic Prefix (CP) OFDM (CP-OFDM) system can solve the multipath delay problem and divide the frequency selective channel into a set of parallel flat channels, thereby simplifying channel estimation and providing a higher channel estimation accuracy. However, the performance of the CP-OFDM system is sensitive to frequency offset and time offset between adjacent sub-bands due to the fact that the OFDM technology introduces relative high levels of out-of-band (OOB) emission due to the sidelobes of the subcarriers. The OOB emission may result in strong interference into neighboring frequency bands. FIG. 1 shows a schematic diagram of side lobes 101 producing overlapping spectra between subcarriers in the frequency domain. To reduce the impact of OOB emission, the edge of the transmission band can dedicate a certain frequency as a guard interval to reduce the influence of out-of-band leakage on adjacent bands. The guard interval, however, introduces waste in the frequency bands and reduces spectrum efficiency.

The Third Generation Partnership Project (3GPP) standard of the Fifth Generation (5G) New Radio (NR) still provides CP-OFDM-based waveforms for communications. When the sub-carrier spacings between adjacent sub-bands are not the same, there can be interference between adjacent sub-bands. Although spectrum leakage and interference between sub-bands can be slightly reduced by techniques such as a soft CP or a filtering method, the guard intervals that reduce spectral efficiency are still required between sub-bands of different sub-carrier spacings.

Currently, there are many scattered idle spectra with very narrow bandwidth in the wireless spectrum resources. These spectra are generally used as guard bands to protect frequency bands from interfering with each other. Transmissions using these scattered idle spectra can increase resource utilization, yet currently there is no practical way of achieving so without interfering with the existing communication systems in adjacent frequency bands. For example, applying a filter to each of the scattered idle spectra for interference suppression can suppress interference between sub-bands, but it imposes a huge amount of complexity in communication system designs. The filter can also cause inter-symbol interference because each of the scattered idle spectrum is very narrow.

This patent document discloses techniques that can be implemented in various embodiments to increase spectrum utilization by using the scattered idle spectra without causing sub-band interference with the existing communication systems. The disclosed techniques also allow multiple discrete spectra to be processed using the same processing procedure, thereby reducing the design complexity of communication systems.

Figure 2:
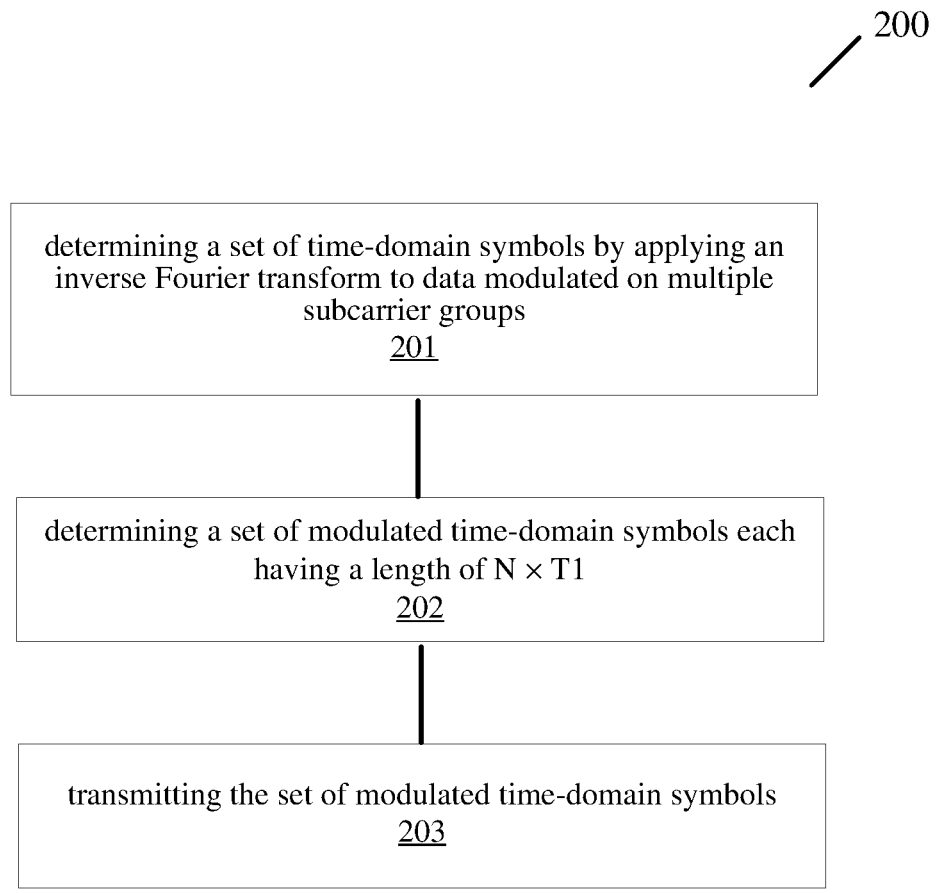
FIG. 2 is a flowchart representation of a wireless communication method in accordance with one or more embodiments of the present technology.

FIG. 2 is a flowchart representation of a wireless communication method 200 in accordance with one or more embodiments of the present technology. The method 200 includes, at step 201, determining a set of time-domain symbols by applying an inverse Fourier transform to data modulated on multiple subcarrier groups. Each subcarrier group comprises one or more subcarriers and adjacent subcarrier groups are separated by one or more unused subcarriers, each symbol having a symbol length of T0. The method 200 includes, at step 202, determining a set of modulated time-domain symbols each having a length of N×T1 by modulating the set of time-domain symbols using a waveform function. Here, N is a real number greater than 1. The method 200 also includes, at step 203, transmitting the set of modulated time-domain symbols.

For example, data is modulated on M discrete subcarrier groups in the idle spectra, where M≥2. Each subcarrier group includes P(m) subcarriers, where P(m)≥1. The subcarrier groups are separated by K(m)≥1 unused subcarriers (e.g., subcarriers carrying zeros). The unused subcarriers correspond to the spectra of existing communication systems that are used for data transmissions.

Here, m=0, 1, . . . , M−1. In some embodiments, individual subcarrier groups include different numbers of subcarriers—that is, P(i)≠P(i+k). In some embodiments, each subcarrier group includes the same number of subcarriers. That is, P(0)=P(1)= . . . =P(M−1). For example, P(m) can be 1 for all subcarrier groups. Because the scattered spectra can be narrow, in some embodiments, K(m)≥P(m), which indicates that the unused subcarriers (e.g., subcarriers carrying zeros) are wider than the scattered spectra. In some embodiments, the scattered spectra are particularly narrow such that K(m)≥(P(m)+P(m+1)).

In some embodiments, T0 is equal to an inverse of a subcarrier space of the set of time-domain symbols. When P(m)=1, T1 can be greater than, equal to, or smaller than T0 because there is no interference between adjacent subcarriers in the group when there is only one subcarrier. When P(m)≥2, there may exist interference between adjacent subcarriers, so it is desirable to have T1>T0. For example, T1=A×T0. The value of A can be bigger than 1 (e.g., based on the CP length in existing LTE systems). Simulation results indicate that A can be [15/14, 2] or [8/7, 2] for optimal transmission quality. In some embodiments, A≥0.5 when P(m)=1.

In some embodiments, the waveform function includes a root-raised cosine function, a raised cosine function, a piecewise function, or a rectangular function. The raised cosine function can be a Fourier transform of a raised cosine function in the frequency domain to the time domain. The raised cosine function can also be a direct raised cosine function in the time domain. Similarly, the root raised cosine function can be Fourier transform of a root raised cosine function in the frequency domain to the time domain. The root raised cosine function can also be a direct root raised cosine function in the time domain. The piecewise function can be a function in which a non-zero function value is represented by combining a plurality of mathematical expressions in different independent variable intervals, such as a step function with multiple non-zero platform values. In some embodiments, a maximum span between independent variables corresponding to non-zero function values of the waveform function is greater than T1. For example, the maximum span can be 2×T1, 3×T1, or 5×T1.

In some embodiments, modulating the set of time-domain symbols comprises repeating individual symbols in the set of time-domain symbols to obtain data sequences each having a time-domain length of S×T0 (S>1). Repeating the symbols in the time-domain allows the symbols to be transformed into narrower frequency-domain data on the receiving end, thereby reducing the interference between adjacent frequency bands. The modulation also includes determining modulated data sequences by dot-multiplying function values of the waveform function and the data sequences respectively which further reduces the bandwidth of modulated data sequences in frequency-domain, and superimposing the modulated data sequences to obtain the modulated set of time-domain symbols. A time-domain gap of T1 is added between different modulated data sequences to achieve orthogonality in the modulated set of time-domain symbols. In some embodiments, the modulation can also be implemented as a polyphase filter design, which results in similar effects as the waveform modulation.

In some embodiments, the waveform function is a continuous function, and the discrete function value of the waveform function is obtained by sampling the value of the continuous function. For example, the interval of the sampling is equal to the interval between adjacent discrete data in the time domain data sequence of each symbol. In some embodiments, the waveform function is a discrete function, and the number of discrete function values of the waveform function is the same as the number of discrete data in the time domain data sequence of each symbol having a length of N×T1.

In some embodiments, the set of time-domain symbols includes L consecutive symbols in one subframe or one resource block in a multi-carrier system. For example, the subframe can include R symbols in total, where R≥L. The modulation of the L symbols can be a part of the modulation process for R symbols. That is, the modulated R symbols are equivalent to the modulated L symbols superimposed with other R−L time domain symbols. In some embodiments, a loop superposition in the time domain can be adopted for symbols at the edge of the subframe or resource block to make sure that the length of the subframe is kept as N×T1. In some embodiments, a CP, which is longer than the expected multipath spread, can be added to make the length N×T1+CP so that the receiving end can handle each symbol independently.

In some embodiments, to obtain oversampled time domain data after the inverse Fourier transform, unused subcarriers are added on both sides of the frequency domain data. For example, Q1 and Q2 zeros are added to both sides of the M subcarriers. Q1 and Q2 can be zeros or positive integers.

Figure 3:
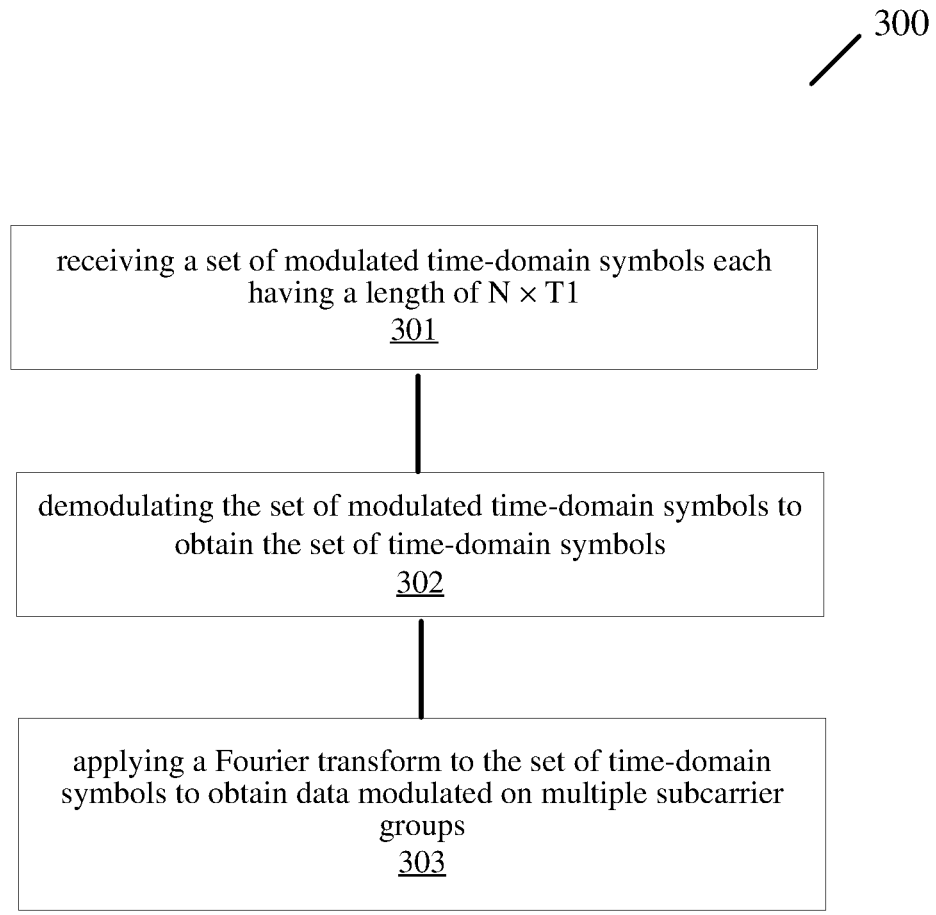
FIG. 3 is a flowchart representation of another wireless communication method in accordance with one or more embodiments of the present technology.

FIG. 3 is a flowchart representation of a wireless communication method 300 in accordance with one or more embodiments of the present technology. The method 300 includes, at step 301, receiving a set of modulated time-domain symbols each having a length of N×T1. The set of modulated time-domain symbols corresponds to an output of applying a waveform function to a set of time-domain symbols each having a symbol length of T0. Here, N is a real number greater than 1. The method 300 includes, at 302, demodulating the set of modulated time-domain symbols to obtain the set of time-domain symbols. The method 300 includes, at 303, applying a Fourier transform to the set of time-domain symbols to obtain data modulated on multiple subcarrier groups. Each subcarrier group comprises one or more subcarriers and adjacent subcarrier groups are separated by one or more unused subcarriers carrying no data.

Using the method described above, discrete spectra in the form of M discrete subcarrier groups can be processed by a single set of base-band processing procedure, thereby reducing the complexity of communication system designs. Because the subcarrier groups are separated by unused subcarriers (e.g., subcarriers carrying zeros), the data transmitted over the discrete scattered spectra can overlap in time-domain with data in the existing communication systems.

Some examples of the disclosed techniques are described in the following example embodiments.

Embodiment 1

Figure 4:
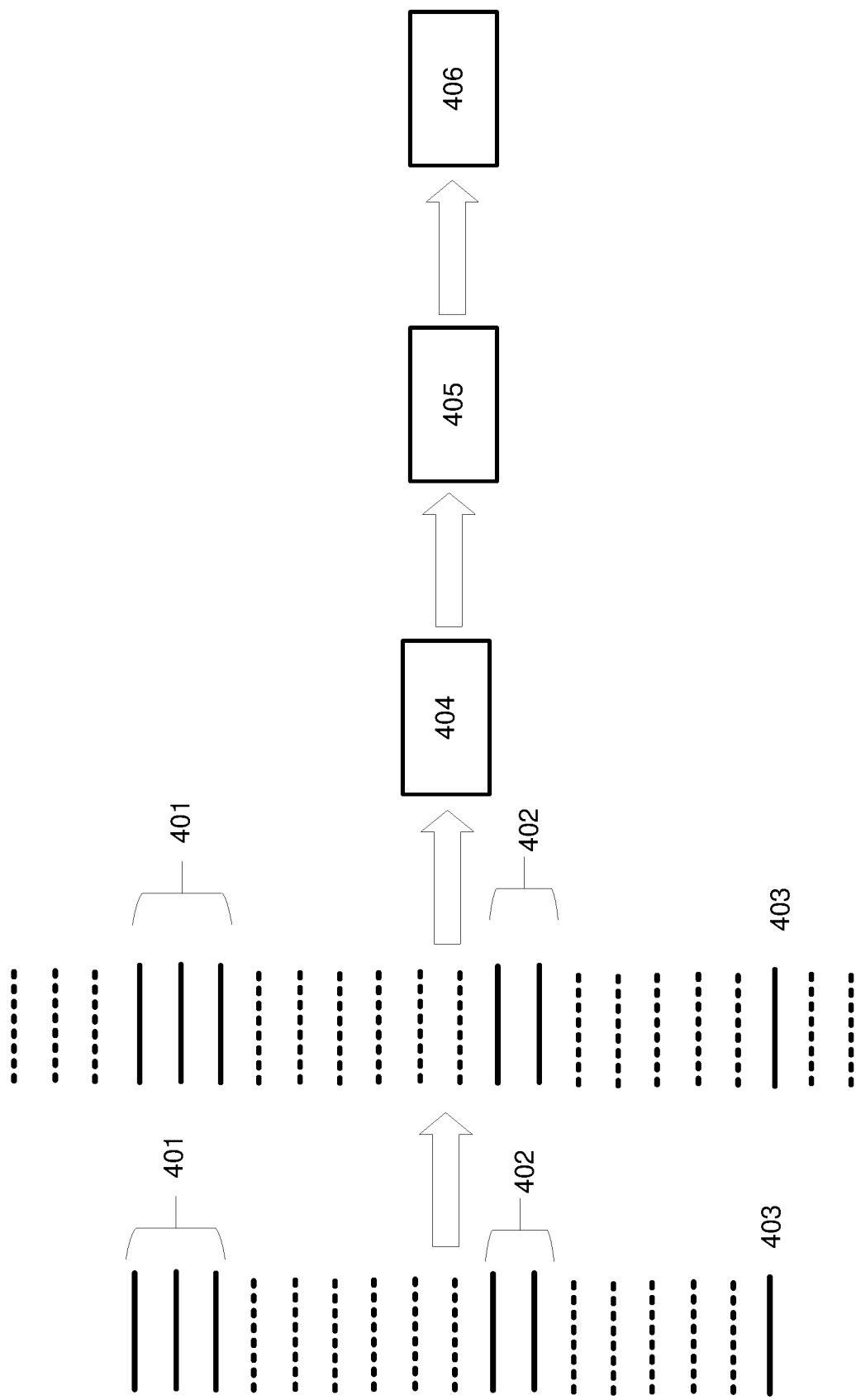
FIG. 4 shows an example of modulating data in accordance with one or more embodiments of the present technology.

FIG. 4 shows an example of modulating data in accordance with one or more embodiments of the present technology. The data is modulated onto three subcarrier groups in the frequency domain. Each subcarrier group can include different number of subcarriers. For example, in FIG. 4, the first subcarrier group 401 includes three subcarriers. The second subcarrier group 402 includes two subcarriers. The third subcarrier group 403 includes one subcarrier. The subcarrier groups are separated by one or more unused subcarriers (that is, subcarriers that carry no data). For example, the first subcarrier group 401 and the second subcarrier group 402 are separated by six unused subcarriers (e.g., six subcarriers that carry zero). The second subcarrier group 402 and the third subcarrier group 403 are separated by five unused subcarriers (e.g., five subcarriers that carry zero).

In some embodiments, to obtain oversampled time domain data after the inverse Fourier transform, unused subcarriers are added on both sides of the frequency domain data. For example, as shown in FIG. 4, Q1=3 unused subcarriers are added to one side of the first subcarrier group 401, and Q2=2 unused subcarriers are added to the other side of the third subcarrier group 403. In some embodiments, the frequency domain data itself may include zeros on both sides, so there is no need to add additional zeros.

The frequency domain data of each symbol is processed by the inverse Fourier transform 404 to obtain time domain data. The time domain data is then modulated using a waveform function (405) to obtain time domain data of length N×T1 for each symbol. The symbols are then superimposed (406) with a time gap of T1 to achieve orthogonality so that the receiving end can successfully decode the data.

Embodiment 2

Figure 5:
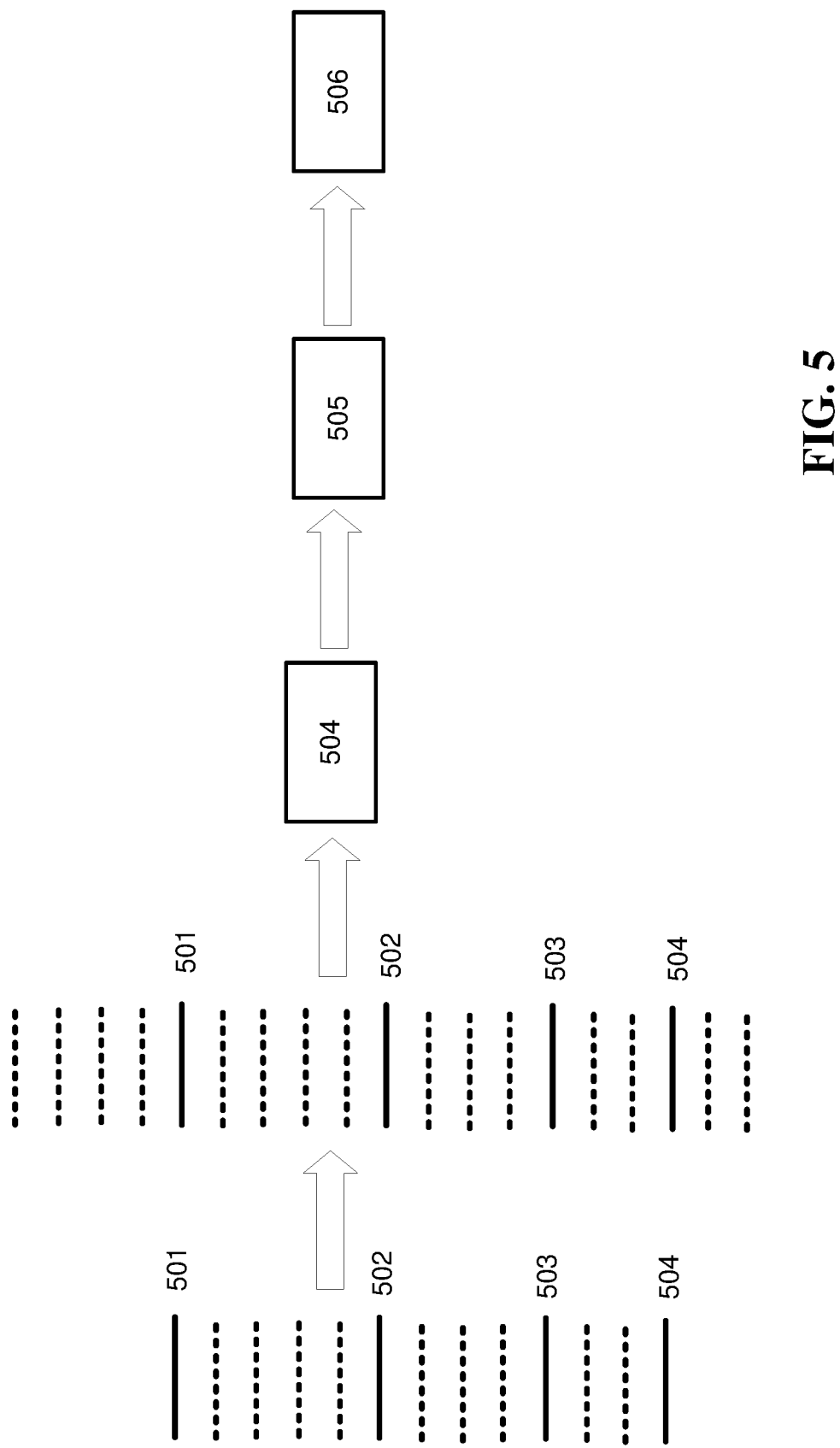
FIG. 5 shows another example of modulating data in accordance with one or more embodiments of the present technology.

FIG. 5 shows another example of modulating data in accordance with one or more embodiments of the present technology. The data is modulated onto four subcarrier groups in the frequency domain. Each subcarrier group can include the same number of subcarriers. For example, in FIG. 5, each of the four subcarrier groups 501, 502, 503, 504 includes one subcarrier. The subcarrier groups are separated by one or more unused subcarriers (that is, subcarriers that carry no data). For example, the first subcarrier group 501 and the second subcarrier group 502 are separated by four unused subcarriers. The second subcarrier group 502 and the third subcarrier group 503 are separated by three unused subcarriers. The third subcarrier group 503 and the fourth subcarrier group 504 are separated by two subcarriers.

Similar to Embodiment 1, to obtain oversampled time domain data after the inverse Fourier transform, unused subcarriers are added on both sides of the frequency domain data. For example, as shown in FIG. 3, Q1=4 unused subcarriers are added to one side of the first subcarrier group 401, and Q2=2 unused subcarriers are added to the other side of the third subcarrier group 403. In some embodiments, the frequency domain data itself may include zeros on both sides, so there is no need to add additional zeros.

The frequency domain data of each symbol is processed by the inverse Fourier transform 504 to obtain time domain data. The time domain data is then modulated using a waveform function (505) to obtain time domain data of length N×T1 for each symbol. The symbols are then superimposed (506) with a time gap of T1 to achieve orthogonality so that the receiving end can successfully decode the data.

Embodiment 3

Figure 6:
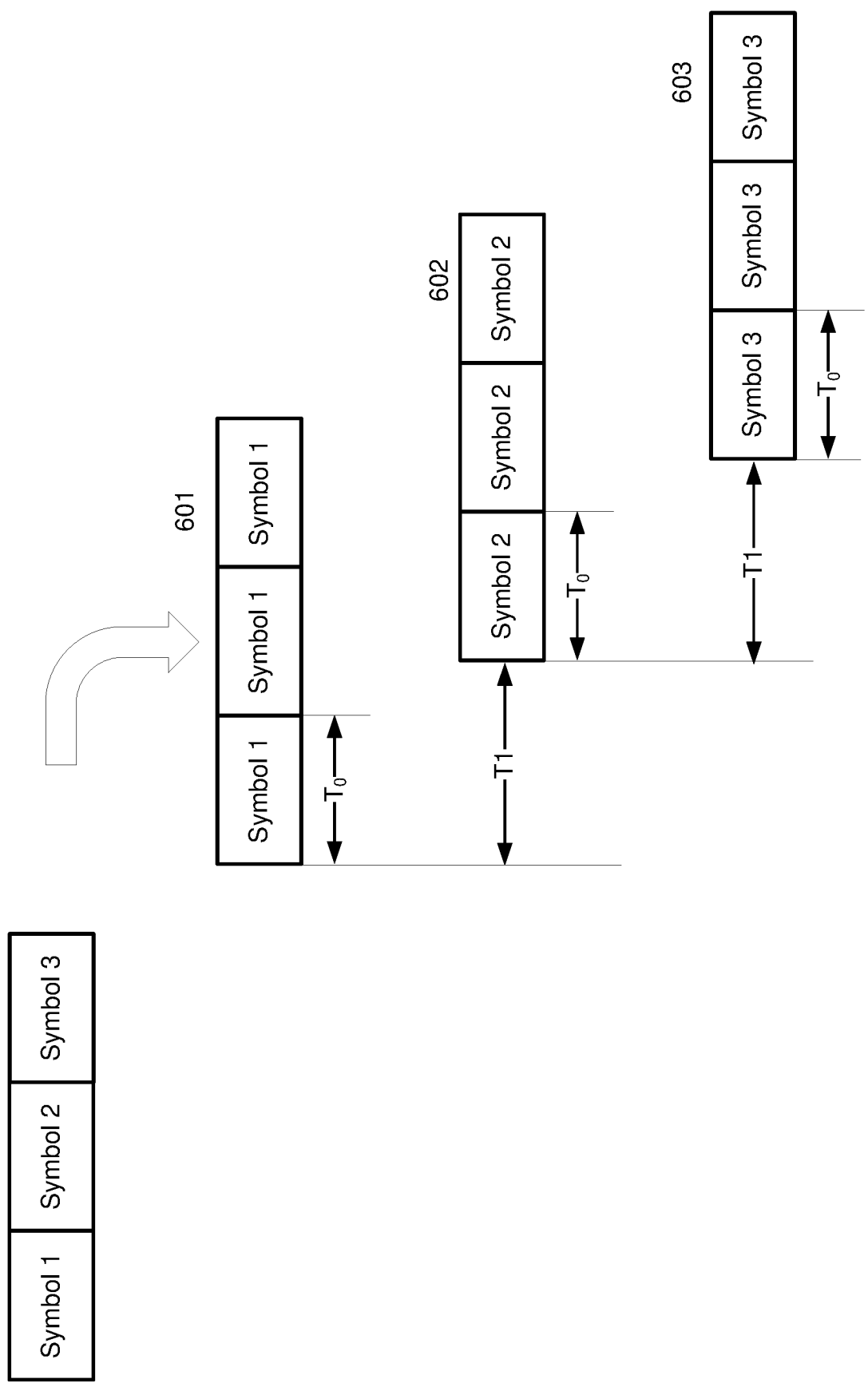
FIG. 6 shows an example of superimposing symbols in accordance with one or more embodiments of the present technology.

FIG. 6 shows an example of superimposing symbols in accordance with one or more embodiments of the present technology. In FIG. 6, L=3 symbols—Symbol 1, Symbol 2, and Symbol 3—are consecutive symbols in one subframe. The subcarrier spacing of the three symbols is $1/T_0$. Each symbol is spread multiple times in the time domain such that the spread data has a length of $S \times T_0$. In this particular example, S=3.

The spread data is then modulated using one or more waveform functions. For example, the discrete function values of a root raised cosine function are respectively dot-multiplied with the spread data of each symbol 601, 602, 603, each having a length of 3×T0. Each spread data can be modulated using the same or different waveform function(s). A shift of T1 in the time domain is then applied when the results of the dot-multiplication are superimposed together to obtain a data sequence of a length (3T0+2T1). T1 is the time-domain spacing between the symbols and is selected such that orthogonality can be achieve when superimposing the different symbols together. Here, T1>T0. In this particular embodiment, the length of each symbol after modulation is 3×T0=(3T0/T1)×T1. That is, N=(3T0/T1).

Figure 7:
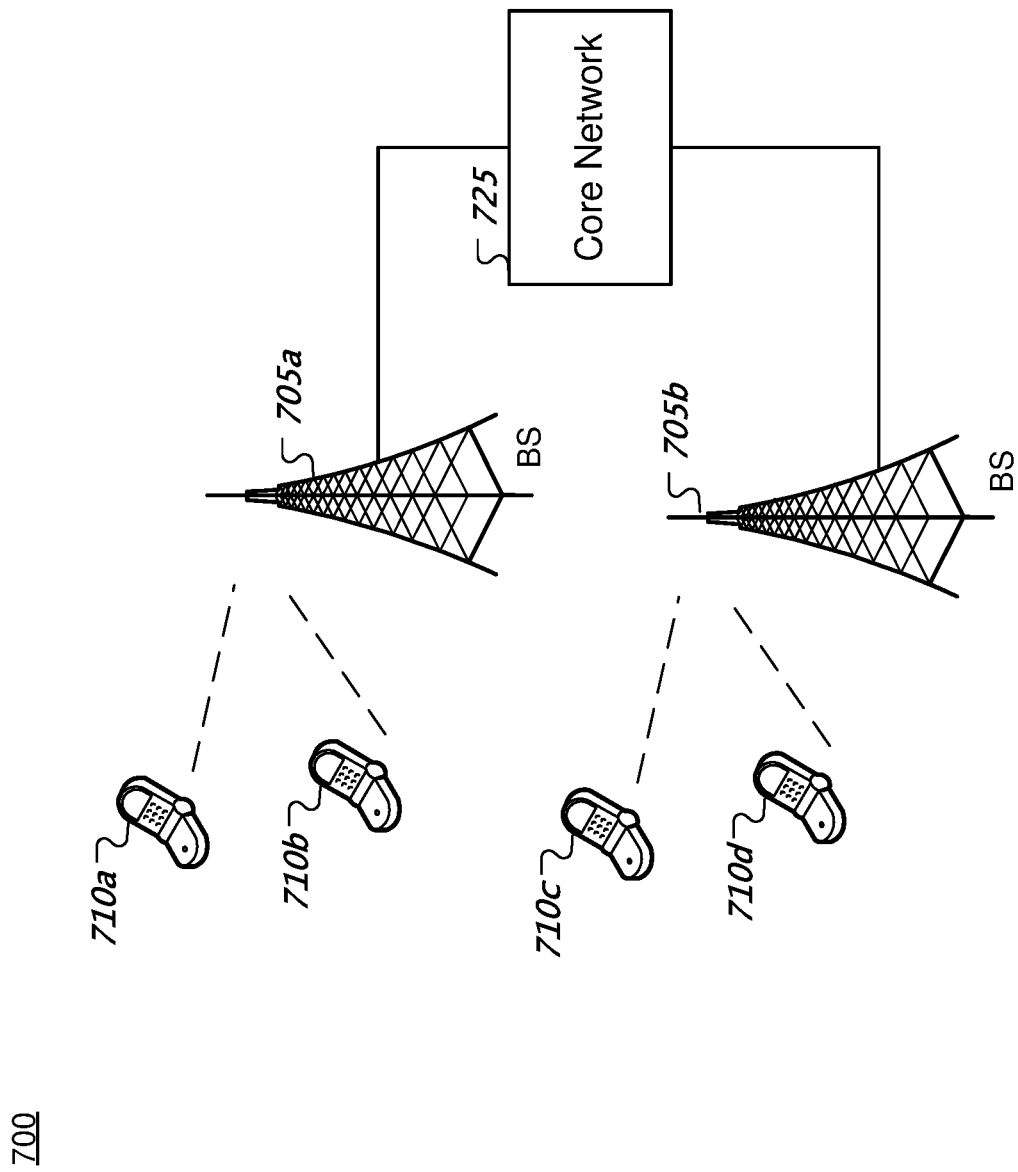
FIG. 7 shows an example of a wireless communication system where techniques in accordance with one or more embodiments of the present technology can be applied.

FIG. 7 shows an example of a wireless communication system 700 where techniques in accordance with one or more embodiments of the present technology can be applied. A wireless communication system 700 can include one or more base stations (BSs) 705a, 705b, one or more wireless devices 710a, 710b, 710c, 710d, and a core network 525. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies.

Figure 8:
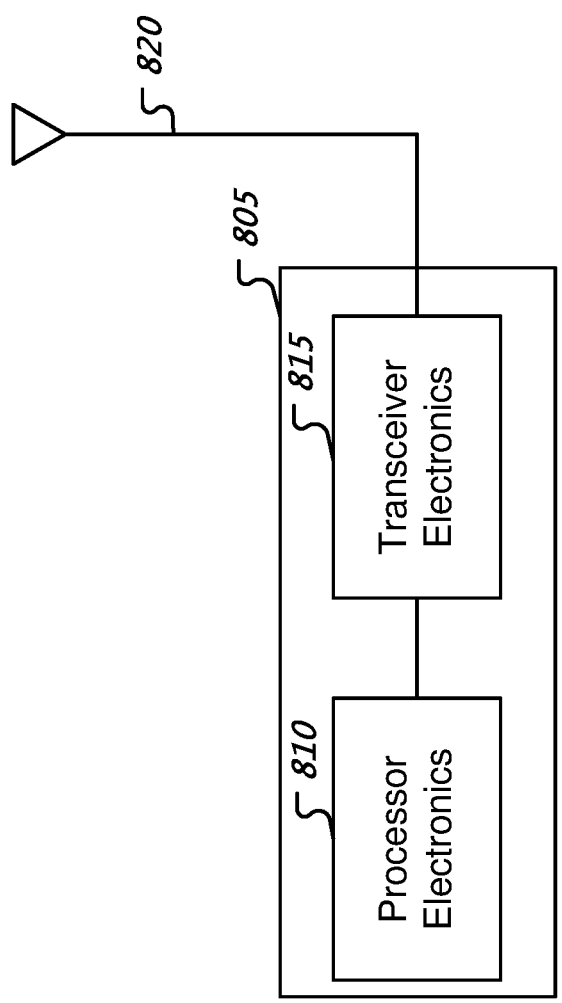
FIG. 8 is a block diagram representation of a portion of a radio station in accordance with one or more embodiments of the present technology can be applied.

FIG. 8 is a block diagram representation of a portion of a radio station. A radio station 805 such as a base station or a wireless device (or UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805.

It will be appreciated that the present document discloses techniques that can be embodied into wireless communication systems to increase spectrum utilization by transmitting data using the scattered narrow spectra without introducing interference among adjacent frequency sub-bands.

In one example aspect, a wireless communication method includes determining a set of time-domain symbols by applying an inverse Fourier transform to data modulated on multiple subcarrier groups. Each subcarrier group comprises one or more subcarriers and adjacent subcarrier groups are separated by one or more unused subcarriers and each symbol has a symbol length of T0. The method includes determining a set of modulated time-domain symbols each having a length of N×T1 by modulating the set of time-domain symbols using a waveform function, where N is a real number greater than 1. The method also includes transmitting the set of modulated time-domain symbols.

In some embodiments, T0 is equal to an inverse of a subcarrier space of the set of time-domain symbols. In some embodiments, T1 is a time-domain spacing between symbols in the set of modulated time-domain symbols.

In some embodiments, each subcarrier group comprises two or more subcarriers, and T1>T0. In some embodiments, each subcarrier group comprises a same number of subcarriers. In some embodiments, individual subcarrier groups comprise different numbers of subcarriers. In some embodiments, the number of the one or more unused subcarriers is greater than or equal to the number of subcarriers in any of the adjacent subcarrier groups.

In some embodiments, the waveform function includes a root-raised cosine function, a raised cosine function, a piecewise function, or a rectangular function. In some embodiments, a maximum span between independent variables corresponding to non-zero function values of the waveform function is greater than T1.

In some embodiments, the modulating the set of time-domain symbols comprises repeating individual symbols in the set of time-domain symbols to obtain data sequences each having a time-domain length of S×T0, where S>1. The modulating also comprises determining modulated data sequences by dot-multiplying function values of the waveform function and the data sequences respectively. The modulating further comprises superimposing the modulated data sequences to obtain the modulated set of time-domain symbols. Here, a time-domain gap of T1 is added between different modulated data sequences.

In some embodiments, the set of time-domain symbols is a subset of symbols in a subframe or a resource block used in a multi-carrier communication system.

In another example aspect, a wireless communication method includes receiving a set of modulated time-domain symbols each having a length of N×T1. The set of modulated time-domain symbols corresponds to an output of applying a waveform function to a set of time-domain symbols each having a symbol length of T0, where N is a real number greater than 1. The method includes demodulating the set of modulated time-domain symbols to obtain the set of time-domain symbols. The method also includes applying a Fourier transform to the set of time-domain symbols to obtain data modulated on multiple subcarrier groups. Each subcarrier group comprises one or more subcarriers and adjacent subcarrier groups are separated by one or more unused subcarriers.

In some embodiments, T0 is equal to an inverse of a subcarrier space of the set of time-domain symbols. In some embodiments, T1 is a time-domain spacing between symbols in the set of modulated time-domain symbols. In some embodiments, each subcarrier group comprises two or more subcarriers, and T1>T0. In some embodiments, each subcarrier group comprises a same number of subcarriers. In some embodiments, individual subcarrier groups comprise different numbers of subcarriers. In some embodiments, the number of the one or more unused subcarriers is greater than or equal to the number of subcarriers in any of the adjacent subcarrier groups.

In some embodiments, the waveform function includes a root-raised cosine function, a raised cosine function, a piecewise function, or a rectangular function. In some embodiments, a maximum span between independent variables corresponding to non-zero function values of the waveform function is greater than T1.

In some embodiments, the set of modulated time-domain symbols is determined by repeating individual symbols in the set of time-domain symbols to obtain data sequences each having a time-domain length of S×T0, where S>1, determining modulated data sequences by dot-multiplying function values of the waveform function and the data sequences respectively, superimposing the modulated data sequences to obtain the modulated set of time-domain symbols. Here, a time-domain gap of T1 is added between different modulated data sequences.

In some embodiments, the set of time-domain symbols is a subset of symbols in a subframe or a resource block used in a multi-carrier communication system.

In another example aspect, a communication apparatus is disclosed. The apparatus comprises a processor configured to implement the methods discussed above.

In yet another example aspect, a computer program product having code stored thereon is disclosed. The code, when executed by a processor, causes the processor to implement the method discussed above.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
determining a set of time-domain symbols by applying an inverse Fourier transform to data modulated on multiple subcarrier groups, wherein each subcarrier group comprises one or more subcarriers and adjacent subcarrier groups are separated by one or more unused subcarriers, each symbol having a symbol length of T0;
determining a set of modulated time-domain symbols each having a length of N×T1 by modulating the set of time-domain symbols using a waveform function, wherein N is a real number greater than 1; and
transmitting the set of modulated time-domain symbols.

2. The method of claim 1, wherein T0 is equal to an inverse of a subcarrier space of the set of time-domain symbols.

3. The method of claim 1, wherein T1 is a time-domain spacing between symbols in the set of modulated time-domain symbols.

4. The method of claim 1, wherein each subcarrier group comprises two or more subcarriers, and T1>T0.

5. The method of claim 1, wherein a number of the one or more unused subcarriers is greater than or equal to a number of subcarriers in any of the adjacent subcarrier groups.

6. The method of claim 1, wherein the modulating the set of time-domain symbols comprises:
repeating individual symbols in the set of time-domain symbols to obtain data sequences each having a time-domain length of S×T0, wherein S>1;
determining modulated data sequences by dot-multiplying function values of the waveform function and the data sequences respectively; and
superimposing the modulated data sequences to obtain the modulated set of time-domain symbols, wherein a time-domain gap of T1 is added between different modulated data sequences.

7. A wireless communication method, comprising:
receiving a set of modulated time-domain symbols each having a length of N×T1, wherein the set of modulated time-domain symbols corresponds to an output of applying a waveform function to a set of time-domain symbols each having a symbol length of T0, wherein N is a real number greater than 1;
demodulating the set of modulated time-domain symbols to obtain the set of time-domain symbols;
applying a Fourier transform to the set of time-domain symbols to obtain data modulated on multiple subcarrier groups, wherein each subcarrier group comprises one or more subcarriers and adjacent subcarrier groups are separated by one or more unused subcarriers.

8. The method of claim 7, wherein T0 is equal to an inverse of a subcarrier space of the set of time-domain symbols.

9. The method of claim 7, wherein T1 is a time-domain spacing between symbols in the set of modulated time-domain symbols.

10. The method of claim 7, wherein each subcarrier group comprises two or more subcarriers, and T1>T0.

11. The method of claim 7, wherein a number of the one or more unused subcarriers is greater than or equal to a number of subcarriers in any of the adjacent subcarrier groups.

12. The method of claim 7, wherein the set of modulated time-domain symbols is determined by:
repeating individual symbols in the set of time-domain symbols to obtain data sequences each having a time-domain length of S×T0, wherein S>1;
determining modulated data sequences by dot-multiplying function values of the waveform function and the data sequences respectively; and
superimposing the modulated data sequences to obtain the modulated set of time-domain symbols, wherein a time-domain gap of T1 is added between different modulated data sequences.

13. A communication apparatus, comprising a processor configured to implement a method, comprising:
determine a set of time-domain symbols by application of an inverse Fourier transform to data modulated on multiple subcarrier groups, wherein each subcarrier group comprises one or more subcarriers and adjacent subcarrier groups are separated by one or more unused subcarriers, each symbol having a symbol length of T0;
determine a set of modulated time-domain symbols each having a length of N×T1 by modulation of the set of time-domain symbols with a waveform function, wherein N is a real number greater than 1; and
transmit the set of modulated time-domain symbols.

14. The communication apparatus of claim 13, wherein T0 is equal to an inverse of a subcarrier space of the set of time-domain symbols.

15. The communication apparatus of claim 13, wherein T1 is a time-domain spacing between symbols in the set of modulated time-domain symbols.

16. The communication apparatus of claim 13, wherein each subcarrier group comprises two or more subcarriers, and T1>T0.

17. A communication apparatus, comprising a processor configured to implement a method, comprising:
receive a set of modulated time-domain symbols each having a length of N×T1, wherein the set of modulated time-domain symbols corresponds to an output of an application of a waveform function to a set of time-domain symbols each having a symbol length of T0, wherein N is a real number greater than 1;
demodulate the set of modulated time-domain symbols to obtain the set of time-domain symbols;
apply a Fourier transform to the set of time-domain symbols to obtain data modulated on multiple subcarrier groups, wherein each subcarrier group comprises one or more subcarriers and adjacent subcarrier groups are separated by one or more unused subcarriers.

18. The communication apparatus of claim 17, wherein T0 is equal to an inverse of a subcarrier space of the set of time-domain symbols.

19. The communication apparatus of claim 17, wherein T1 is a time-domain spacing between symbols in the set of modulated time-domain symbols.

20. The communication apparatus of claim 17, wherein each subcarrier group comprises two or more subcarriers, and T1>T0.

* * * * *